US 6,744,955 B2

(12) United States Patent
Nechitailo et al.

(10) Patent No.: US 6,744,955 B2
(45) Date of Patent: Jun. 1, 2004

(54) BUFFER TUBE HAVING A HIGH FIBER COUNT RIBBON STACK PACKAGING CONFIGURATION AND CORNER CUSHIONS

(75) Inventors: Nicholas V. Nechitailo, Conover, NC (US); Raymond G. Lovie, Hickory, NC (US)

(73) Assignee: Alcatel, Paris (FR)

( * ) Notice: Subject to any disclaimer, the term of this patent is extended or adjusted under 35 U.S.C. 154(b) by 329 days.

(21) Appl. No.: 09/893,712

(22) Filed: Jun. 29, 2001

(65) Prior Publication Data

US 2003/0012531 A1 Jan. 16, 2003

(51) Int. Cl.[7] .................................................. G02B 6/44
(52) U.S. Cl. ............................................... 385/114
(58) Field of Search ..................... 385/100, 109–112, 385/114

(56) References Cited

U.S. PATENT DOCUMENTS

| 4,078,853 A | 3/1978 | Kempf et al. |
|---|---|---|
| 4,822,133 A | 4/1989 | Peacock |
| 4,859,023 A | 8/1989 | Eichenbaum et al. |
| 4,906,067 A | 3/1990 | Mayr et al. |
| 5,243,675 A | 9/1993 | Kathiresan et al. |
| 5,542,019 A | 7/1996 | Pascher |
| 5,621,842 A | 4/1997 | Keller |
| 5,638,478 A | 6/1997 | Iwakura et al. |
| 5,878,180 A | 3/1999 | Nothofer et al. |
| 6,018,605 A | 1/2000 | Mills et al. |
| 6,192,178 B1 * | 2/2001 | Logan et al. ............... 385/109 |
| 6,229,944 B1 * | 5/2001 | Yokokawa et al. ......... 385/114 |

* cited by examiner

Primary Examiner—Khiem Nguyen
(74) Attorney, Agent, or Firm—Sughrue Mion, PLLC

(57) ABSTRACT

A buffer tube and fiber optic cable having an optimized ribbon stack packaging configuration, minimized attenuation problems and a reduced overall cable diameter and weight is provided. Specifically, a packaging configuration utilizing parallel lying and perpendicular lying fiber ribbons is configured into a ribbon stack having a square shape or cross-type configuration. Cushions may be placed between the high-fiber count ribbon stack and buffer tube walls thus enabling the ribbon stack to center itself within the tube thereby decreasing attenuation problems.

33 Claims, 4 Drawing Sheets

BUFFER TUBE HAVING A HIGH FIBER COUNT RIBBON STACK PACKAGING CONFIGURATION AND CORNER CUSHIONS

TECHNICAL FIELD

The present invention relates to the field of fiber optic cables and more specifically to efficient high-fiber count ribbon stack packaging configurations having corner cushions to avoid contact between corner fibers and a buffer tube wall thus reducing attenuation problems.

BACKGROUND

Fiber optic cables enable communication networks to operate with wide bandwidth and low noise operation. As communication technologies and data transmission mediums evolve, there is an increasing demand for fiber optic cables with greater bandwidth and minimal distortion. Manufacturers of optical cables attempt to satisfy these demands through innovative fiber optic designs. In doing so, numerous factors must be considered to produce an optimal and functional cable.

For example, packing configurations of fiber ribbon stacks within the buffer tube affects the diameter, weight and cost of the buffer tube and ultimately the fiber optic cable. Therefore, efficient packaging configurations for cables, containing high-fiber count ribbon stacks, are continuously tested.

Similarly, while attempting to achieve an optimal high-fiber count ribbon stack configuration and reduced cable diameter, a manufacture may also attempt to minimize attenuation problems. A buffer tube typically houses a fiber ribbon stack configuration. Often times, the fiber ribbon stack is loosely housed within the buffer tube thus allowing the ribbon stack to move within the buffer tube. Attenuation problems occur when the corner fibers of the ribbon stack contact the buffer tube walls. Typically, such contact may be due to bending of the buffer tube, transverse compression of the tube, or contraction of the tube due cold temperatures or elongation of the tube due to tension. Attenuation results in transmission loss. Thus, decreasing attenuation within a buffer tube will increase the overall performance of the fiber optic cable.

Currently, the existing art fails to take into account the need for stabilization among high-fiber count ribbon stacks in order to decrease attenuation problems. Furthermore, the prior art fails to provide an optimal packaging configuration for high-fiber count ribbon stacks. Therefore, it would be desirable to design an optimal packaging configuration for ribbon stacks having a high-fiber count such that the number of fibers per unit square area of the buffer tube cross-section increases, while minimizing attenuation problems and the overall cable diameter.

SUMMARY OF THE INVENTION

The present invention solves the above described problems by providing a high-fiber count ribbon cable having improved mechanical and optical performance, in addition to a reduced overall cable diameter and cable weight. Specifically, the present invention discloses an efficient packaging configuration using 12-fiber ribbons and 24-fiber ribbons to formulate a high-fiber count ribbon stack while utilizing cushions to fill the empty spaces of the buffer tube that houses the ribbon stack. The cushions enable the ribbon stack to center itself within the tube thereby decreasing attenuation problems.

The optimal and efficient packaging configurations of the present invention is achieved through multi-parametric optimization that includes numerous buffer tubes and ribbon stack configurations composed of high-fiber count ribbons, such as 12-count fiber ribbons and 24-count fiber ribbons. Specifically, an optimal geometric analysis is performed on fiber optic cables utilizing one to six buffer tubes per cable and having central and stranded tube designs to identify optimal buffer tube configurations and to reduce the overall diameter of the fiber optic cable. Furthermore, parametric criteria used to configure the optimal packaging and high-fiber count ribbon stack designs includes, but is not limited to, minimizing the ribbon stack size (in the diagonal direction), maximizing the fiber count and stack stability, minimizing the number of structural components and minimizing the overall cable diameter. In all, two ribbon stack configurations utilizing parallel lying and perpendicular lying fiber ribbons achieve the above-mentioned goals In an embodiment of the invention, a high-fiber count ribbon stack, having a square shape configuration, is provided. Specifically, fiber ribbons are stacked on top of one another in the parallel direction creating a vertical fiber ribbon stack. Once the vertical stack of parallel lying fiber ribbons is formed, two additional stacks of fiber ribbons are attached to a first and second side of the vertical stack in a perpendicular direction. Coupling the perpendicular lying ribbon stacks to the vertical lying ribbon stack results in a ribbon stack substantially square in shape. The square shaped ribbon stack configuration fits nicely into numerous buffer tubes.

For example, twenty 12-count fiber ribbons may be stacked on top of one another to create a vertical stack. Two additional ribbon stacks, consisting of five 24-count fiber ribbons, may be coupled to each respective side of the vertical stack thereby creating a high-fiber count, square shaped ribbon stack. Accordingly, the total fiber count for this exemplary embodiment is 20×12+10×24=480. Because the total fiber count (480) of a cable utilizing the square shaped ribbon stack configuration is divisible by both 12 and 10, the cable may be utilized in both a foreign and domestic market. Such versatility increases the market value of the cable.

Another embodiment of the invention provides for a high-fiber count ribbon stack having a cross-type configuration. Specifically, the cross-type ribbon stack configuration includes parallel lying fiber ribbons stacked on top of one another to create a vertical fiber ribbon stack. Two perpendicular ribbon stacks, composed of high-fiber count ribbons, are attached to each side of the vertical stack in a manner substantially similar to the square shaped ribbon stack configuration. The cross-type ribbon stack, however, further includes two additional perpendicular fiber ribbon stacks coupled to the sides of the above-disclosed square ribbon stack thus resulting in a cross-type configuration.

For example, twenty-four 12-count fiber ribbons may be stacked on top of one another to create a vertical stack. Two additional ribbon stacks, including five 24-count fiber ribbons, may be coupled to each respective side of the vertical stack thereby creating a high-fiber count square shaped ribbon stack. Furthermore, two additional stacks of three 12-fiber ribbons are perpendicularly coupled to the outer edge of the square shaped ribbon stack. Accordingly, the total fiber count for this exemplary cross-type configuration is 24×12+10×24+6×12=600.

In another embodiment of the invention, a cable utilizing an optimal buffer tube arrangement, wherein each buffer tube houses a cross-type ribbon stack configuration, is provided. The 864-fiber count cable utilizes three stranded buffer tubes. The buffer tubes each house a cross-type high-fiber count ribbon stack configuration. The ribbon stack consists of six 24-fiber ribbons. Additional, a first ribbon stack having six 12-fiber ribbons is affixed to the top of the 24-fiber ribbon stack while six 12-fiber ribbons are affixed to the bottom of the 24-fiber ribbon stack.

In yet another embodiment of the invention, cushions may be used to fill the empty and corner spaces between the ribbon stack and the buffer tube walls. The cushions enable the ribbon stack to center itself within the buffer tube and thus protect the ribbon stack edges from contacting the buffer tube walls. The protection provided by the cushions helps decrease attenuation problems.

Another embodiment of the invention provides for an optic unit, or fiber optic cable, having at least one buffer tube, that contains a high-fiber count ribbon stack having a square shape and/or cross-type configuration as described above. Buffer tubes, arranged in numerous configurations and housing a square shape or cross-type ribbon stack configuration, may be utilized to construct a high-fiber count cable. For example, one, two or three buffer tubes, each containing a cross-type and/or square-type ribbon stack configuration may be stranded together to create a cable. In addition, several buffer tubes, housing the high-fiber count ribbon stack configurations, may be placed around a central strength member and stranded together to create a cable. Such arrangements produce a fiber optic cable having a high-fiber count and an overall reduced diameter. Optionally, cushions may be placed between the buffer tube walls and the corners of the fiber ribbon stacks to decrease possible attenuation and to provide the fiber ribbon stacks with a self-centering ability.

In still another embodiment of the invention, a method of manufacturing a high-fiber count buffer tube is provided. The method includes the steps of: creating a vertical ribbon stack by placing twenty 12-count fiber ribbons on top of one another; coupling two ribbon stacks comprising five 24-fiber count ribbons to the edges of the vertical stack in a perpendicular direction to formulate a square fiber ribbon stack having a total fiber count equal to 480; placing cushions between the buffer tube wall and the square ribbon stack corners in order to reduce transmission loss and placing the square ribbon stack in a buffer tube.

The method of manufacturing a high-fiber count buffer tube may further include the step of: creating a vertical ribbon stack using twenty-four 12-count fiber ribbons; creating a third and fourth stack comprising three 12-count fiber ribbons; affixing the third stack, in a perpendicular direction, to a first side of the square ribbon stack; and affixing the fourth stack, in a perpendicular direction, to a second side of the square ribbon stack thereby constructing a cross-type ribbon stack having a total fiber count equal to 600.

In yet another embodiment of the invention, a method of manufacturing a high-fiber count ribbon stack is provided. The method includes the steps of: creating a vertical ribbon stack by placing fiber ribbons on top of one another in a parallel direction; coupling additional ribbon stacks to the edges of the vertical stack in a perpendicular direction to formulate a fiber ribbon stack having a substantially square shape.

The method of manufacturing a high-fiber count ribbon stack may further include the steps of: creating a third and fourth ribbon stack; affixing the third ribbon stack, in a perpendicular direction to a first side of the square stack; and affixing the fourth stack, in a perpendicular direction to a second side of the square stack thereby constructing a cross-type ribbon stack configuration.

DETAILED DESCRIPTION

The present invention will now be fully described with reference to the accompanying drawings, wherein preferred embodiments of the invention are shown. This invention may be embodied in many different forms and should not be construed as limited to the embodiments set forth herein. Rather these embodiments are provided so that the disclosure will be thorough and complete.

Figure 1:
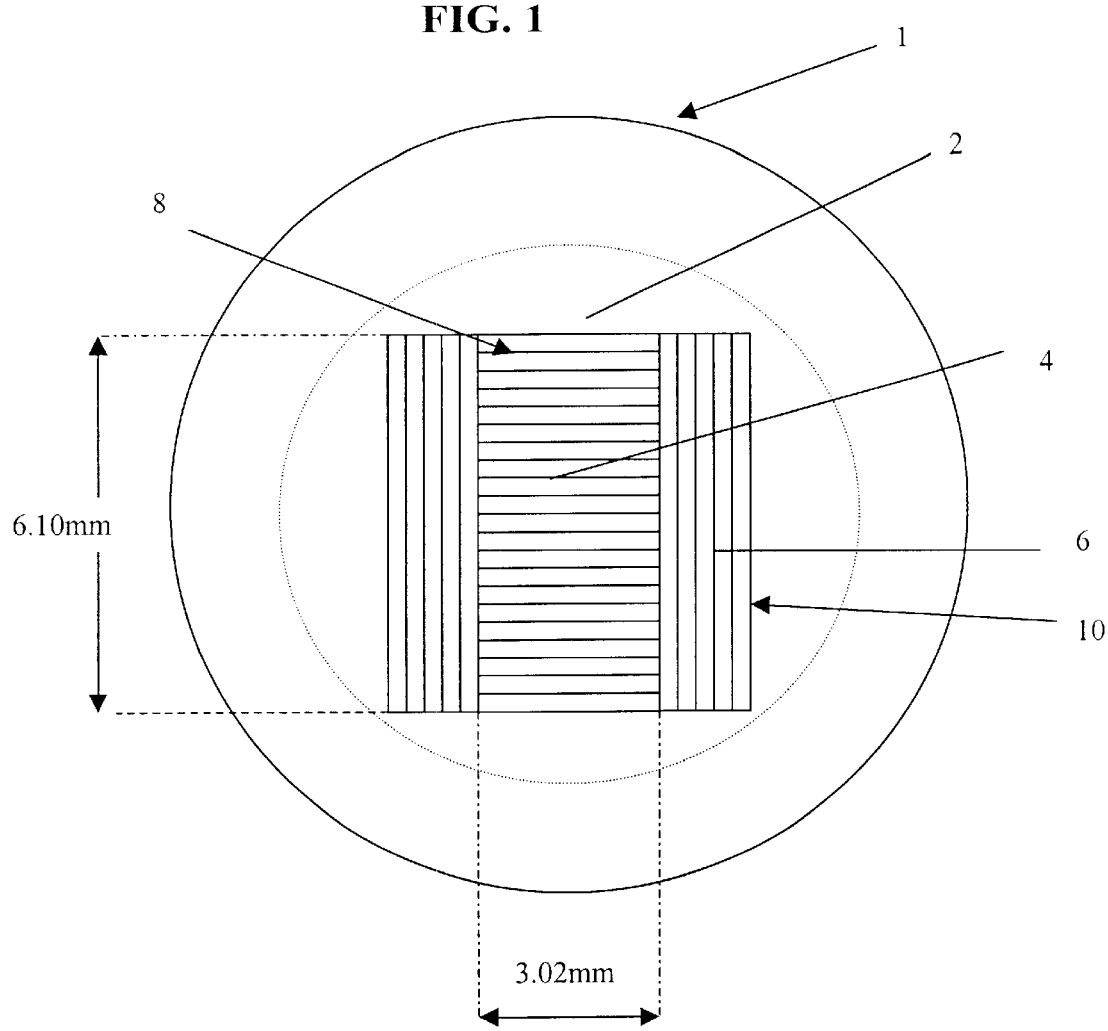
FIG. 1 is a cross-sectional view of the end portion of a buffer tube housing a high-fiber count ribbon stack configuration having a square shape.

Referring now to FIG. 1, a buffer tube housing a high-fiber count ribbon stack configuration, having a substantially square shape, is displayed. The buffer tube 1 of the present invention contains a fiber ribbon stack 2 having a high-fiber count and an efficient packaging configuration. The ribbon stack 2 comprises two ribbon types, 12-count fiber ribbons 4 and 24-count fiber ribbons 6, to provide an optimal fiber count. It is important to note, however, that the optimization methods and ribbon stack configurations provided herein may be utilized using numerous fiber ribbons that have a variety of fiber counts. Therefore, the invention should not be limited to the 12-count and 24-count fiber ribbons as described herein. Instead, any combination of parallel and perpendicular lying fiber ribbons housed within a variety of buffer tube formats fall within the scope of this invention.

For existing 12-count fiber ribbons of the size 0.305 mm by 3.020 mm and for 24-count fiber ribbons of the size 0.325 mm by 6.055 mm, there are at least two optimal packaging configurations. As will be described in greater detail below, the two optimal packaging solutions resulted in ribbon stacks having a square shape and a cross-type configuration.

Turning again to FIG. 1, a high-fiber count ribbon stack, substantially square in shape, is shown. Specifically, a vertical stack 8 of 12-count fiber ribbons 4 may be formed by placing 12-count fiber ribbons 4, lying in a parallel direction along an imaginary x-axis as shown in FIG. 1, on top of one another. Optimally, the vertical stack 8 may consist of twenty 12-count fiber ribbons 4. The fiber stack, as depicted in FIG. 1, further includes two perpendicular stacks 10 having five 24-count fiber ribbons 6. Each perpendicular stack 10 may be attached to a respective side of the vertical stack 8 in a perpendicular direction.

Conventionally, each 12-count fiber ribbon 4 has a size of 0.305 mm by 3.020 mm while each 24-count fiber ribbon 6 has a size approximately equal to 0.325 mm by 6.055 mm. By combining the vertical stack of twenty 12-fiber ribbons 4/8 and two additional stacks of five 24-count fiber ribbons 6/10 (located on each side of the vertical stack in a perpendicular direction), the ribbon stack 2 results in a square shape with a size approximately equal to 6.1 mm by 6.1 mm. (that is 6.055 mm by 3.02 mm+10(0.325 mm)=6.27). The total fiber count for the above-described ribbon stack, having a substantially square shape, is 20×12+10×24=480. Because the total fiber count (480) of a buffer tube housing the above-described square ribbon stack configuration is divisible by both 12 and 10, a cable composed of one or more of such buffer tubes may be utilized in both a foreign and domestic market because the fiber count is divisible by 2, 3, 4, 5, 6, 8, 10, 12 and 24. As would be recognized by one of skill in the art, domestic cable customers typically prefer cables with a 12× count while foreign customers prefer cables having a 4×, 5× and 10× count. Designing a cable with the versatility to satisfy both markets increases the market value of the cable. Furthermore, as will be described in detail below, the square shaped ribbon stack configuration fits easily into the family of buffer tube configurations as shown in FIGS. 4A–4F.

Figure 2:
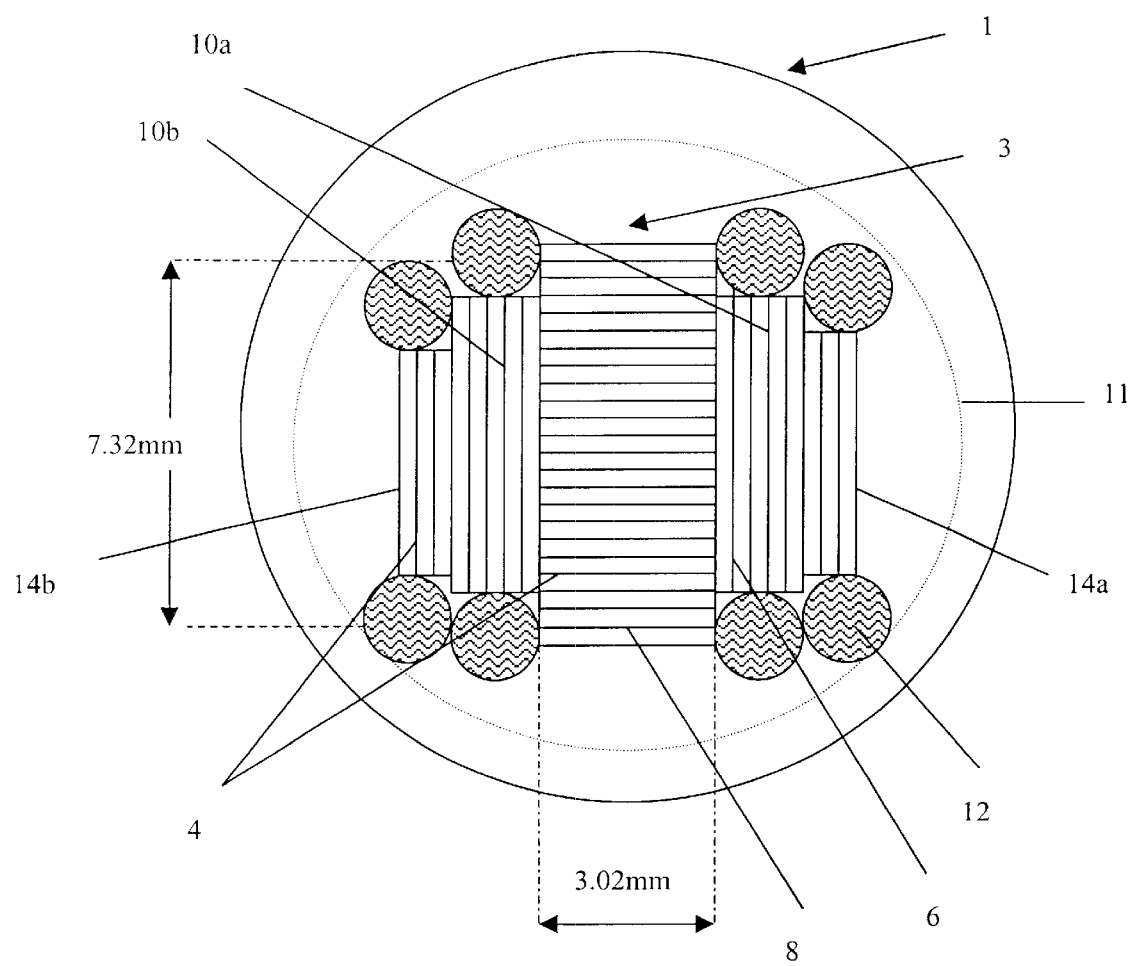
FIG. 2 is a cross-sectional view of the end portion of a buffer tube housing a cross-type ribbon stack configuration having parallel and perpendicular lying fiber ribbons in addition to corner cushions according to the invention.

Turning now to FIG. 2, FIG. 2 shows a ribbon stack having corner cushions 12 and a cross-type ribbon stack configuration. The cross-type ribbon stack 3 is yet another embodiment that utilizes parallel and perpendicular lying 12-count and 24-count fiber ribbons 4/6 to create optimal and efficient packaging configurations.

The cross-type ribbon stack configuration 3 is substantially similar to the ribbon stack having a square shape 2, however, the cross-type ribbon stack configuration 3 further includes two small stacks of three 12-count fiber ribbons 14(a)/14(b) coupled to an outer edge of the first and second perpendicular fiber ribbon stacks 10.

Specifically, a vertical stack 8 of 12-count fiber ribbons 4 is formed by placing twenty-four 12-count fiber ribbons 4, lying in a parallel direction along an imaginary x-axis, as shown in FIG. 2, on top of one another. The cross-type ribbon stack 3 further includes two perpendicular stacks 10 comprising five 24-count fiber ribbons 6. Each perpendicular stack 10 is attached to a respective side of the vertical stack 8 in a perpendicular direction. The cross-type ribbon stack configuration also includes two additional small ribbon stacks 14a/14b having three 12-count fiber ribbons. A first small ribbon stack 14(a) is attached to a first perpendicular stack 10a, while a second small stack 14(b), having three 12-count fiber ribbons, is attached to a second perpendicular stack 10(b) thereby resulting in a cross-type or non-rectangular ribbon stack configuration as shown in FIG. 2.

The total fiber count for the cross-type ribbon stack 3 is equal to 24×12+10×24+6×12=600. As previously indicated, because the total fiber count (600) of a cable utilizing the cross-type ribbon stack 3 configuration is divisible by both 12 and 10, the cable may be utilized in both a foreign and domestic market.

Cushions 12, as shown in FIG. 2, may be utilized to fill the empty and corner spaces between the high-fiber count ribbon stack configurations 2/3 and the interior walls 11 of the buffer tube 1 to help minimize attenuation problems. The cushions 12 enable the ribbon stack 2/3 to center itself within the buffer tube 1 and also protects the ribbon stack edges from contacting the interior walls 11 of the buffer tube. The cushions 12 may be utilized in a buffer tube having a cross-type ribbon stack configuration as shown in FIG. 2 or in a buffer tube having a ribbon stack square in shape. Furthermore, the cushions 12 may be utilized with any ribbon stack and should not be limited to the ribbon stacks disclosed herein.

The cushions 12 act as a soft "bumper" when the buffer tube 1 encounters bending, transverse compression, contraction due cold temperatures or elongation due to tension. Due to the soft, deformable space-type cushion material, located between the corner fibers of the ribbon stack 2/3 and the buffer tube walls 11, attenuation problems may be minimized. Preferably, the cushions 12 may be made of a soft material with a low coefficient of thermal expansion. Examples of such materials include but are not limited to: yarns and threads made of a variety of organic materials such as polyester, cotton and wool.

Furthermore, the cushion 12 may be formed in numerous shapes to provide the needed protection such as: threads and yarns having circular, oval, rectangular, trapezoidal and other non-circular cross-sections. A family of solid, porous and hollow soft tube configurations are also within the scope of this invention. Additionally, a cushion having any shape is also within the scope of this invention. The Young's modulus of the cushion material may be preferably above that of the gel utilized in conventional buffer tubes such that the cushion properly provides a cushioning function. Overall, the thermo-mechanical properties of the cushion 12 should smooth stresses encountered during bending or thermal expansion and/or shrinkage.

Figure 3:
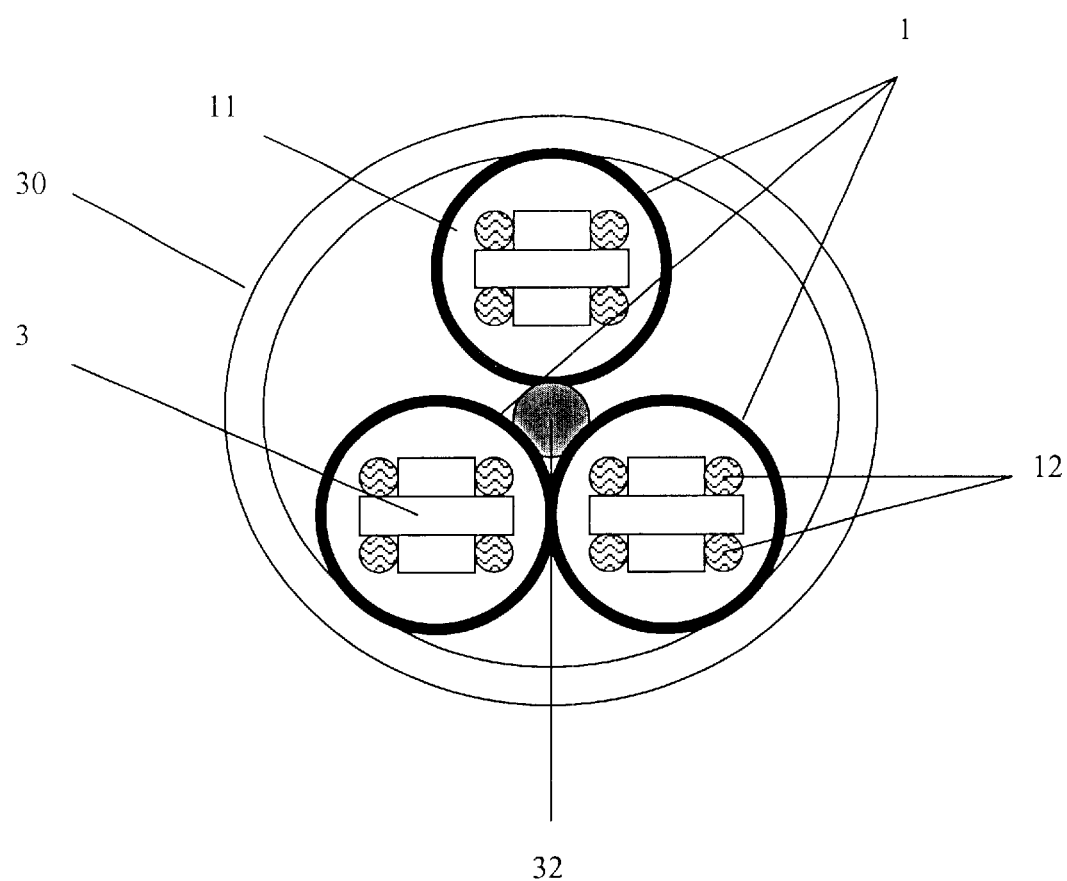
FIG. 3 is a cross-sectional view of the end portion of a high-fiber count optic cable having three buffer tubes containing high-fiber count ribbon stacks having cross-type configurations according to the invention.
Figure 4A:
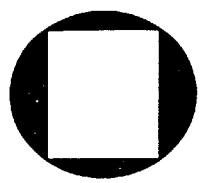
FIGS. 4A–4F are diagrammatical views of the various buffer tube assortments that optimize diameter size and provide high-fiber counts that can be utilized in both foreign and domestic markets.
Figure 4B:
Figure 4C:
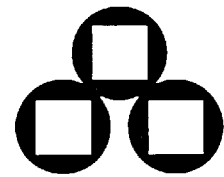
Figure 4D:
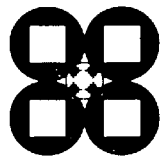
Figure 4E:
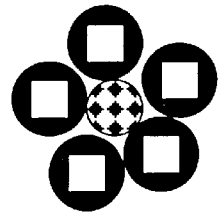
Figure 4F:
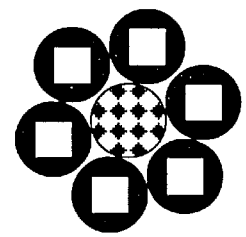

FIG. 3 depicts a cable having an optimal buffer tube configuration wherein each buffer tube houses a high-count fiber ribbon stacks having a cross-type configuration. Namely, an outer shell 30 includes three buffer tubes 1 that are stranded around central strength member 32. Each buffer tube 1 houses an efficiently packaged ribbon stack 3 having a cross-type configuration. Corner cushions 12 provide a deformable bumper between the buffer tube walls 11 and the ribbon stack 3 to minimize attenuation problems.

FIG. 3 portrays a single example of an optimal buffer tube configuration. For example, a 864 fiber count cable may be formed using this buffer tube and cross-type ribbon stack configuration. Specifically, the 864-fiber count cable utilizes three stranded buffer tubes. The buffer tubes each house a cross-type high-fiber count ribbon stack configuration. The ribbon stack consists of six 24-fiber ribbons. Additional, a first ribbon stack having six 12-fiber ribbons is affixed to the top of the 24-fiber ribbon stack while six 12-fiber ribbons are affixed to the bottom of the 24-fiber ribbon stack.

The high-fiber count ribbon stack configurations described above result in a ribbon stack having a reduced diagonal size. This reduction in the diagonal size of the ribbon stack allows the buffer tube diameter to be decreased, which ultimately provides for a reduction in the overall diameter of the fiber optic cable.

Turning now to FIGS. 4A–4F, a family of optimal buffer tube configurations that may house the high-fiber count ribbon stacks of the invention is shown. For example, one (FIG. 4A), two (FIG. 4B) and three (FIG. 4C) buffer tubes can be used to form an optical cable. The white area 40 represents both the square 2 and cross-type ribbon stack 3 configurations, while the dark area 42 is representative of empty or wasted space. It is within this space that cushions may be placed. As for FIGS. 4C–4F, buffer tubes 1 are stranded around a central strength member 32 while each buffer tube 1 houses a square shaped 2 or cross-type 3 ribbon stack. These six configurations achieve an optimal buffer tube arrangement for fiber optic cables because the overall diameter and weight of the fiber optic cable is reduced when these arrangements are employed.

Table 1 below illustrates the fiber counts that may be obtained using either the square ribbon stack 2 having a total fiber count of 480 or the cross-type ribbon stack 3 having a fiber count of 600, in each buffer tube configuration of FIGS. 4A–4F. For example, using the configuration of FIG. 4D, having four buffer tubes housing square shaped ribbon stacks, the total fiber count of the cable would equal 1920. However, a cable utilizing the configuration of FIG. 4F, having six buffer tubes housing ribbon stacks having a cross-type configuration registers a total fiber count equal to 3600. The present invention therfore provides for an optimal buffer tube configuration having a high-fiber count, an overall reduced cable diameter and weight and further provides protection against possible attenuation problems.

TABLE 1

| Number of Buffer Tubes | 480-fiber ribbons | 600-fiber ribbons |
| --- | --- | --- |
| 1 | 480 | 600 |
| 2 | 960 | 1200 |
| 3 | 1440 | 1800 |
| 4 | 1920 | 2400 |
| 5 | 2400 | 3000 |
| 6 | 2880 | 3600 |

A method of manufacturing a high-fiber count ribbon stack is also provided by the invention. Specifically, the method of manufacture includes the following steps: creating a vertical stack by placing parallel lying 12-count fiber ribbons on top of one another thus creating a vertical stack having a first and second side; coupling two separate perpendicular stacks, each having 24-count fiber ribbons to the first and second side of the vertical stack; affixing the perpendicular stacks to the vertical stack thereby producing a square shaped ribbon stack configuration.

The method of manufacturing a high-fiber count ribbon stack may further include the steps of: creating two separate stacks of three 12-count fiber ribbons and affixing the respective stacks to a first and second side of the square stack, thereby resulting in a ribbon stack having a cross-type configuration.

A method of manufacturing optimal packaging configurations resulting in high-fiber count cables is also provided. Specifically, the method for manufacturing a square shaped ribbon stack includes the following steps. Creating a vertical stack by placing parallel lying 12-count fiber ribbons on top of one another thus creating a vertical stack having a first and second side. Coupling two separate perpendicular stacks, each having 24-count fiber ribbons to the first and second side of the vertical stack. By affixing the perpendicular stacks to the vertical stack, a substantially square shaped ribbon stack is formed. Next, the cushions are optionally added to the corners of the ribbon stack. The ribbon stack is then encapsulated in a buffer tube.

The method of manufacturing an optimal packaging configuration may further include the steps of creating two separate stacks of three 12-count fiber ribbons and affixing the respective stacks to a first and second side of the square stack, thereby resulting in a ribbon stack having a cross-type configuration. Cushions may also be placed around the cross-type ribbon stack. The cross-type ribbon stack is then encapsulated in a buffer tube.

What is claimed is:

1. A ribbon stack configuration comprising:
    a plurality of fiber ribbons, wherein said fiber ribbons, lying in a parallel direction, are vertically stacked to create a vertical stack having a first side and a second side;
    a first perpendicular group having a plurality of fiber ribbons, wherein said first group is perpendicularly affixed to said first side of said vertical stack; and
    a second perpendicular group having a plurality of fiber ribbons, wherein said second group is perpendicularly affixed to said second side of said vertical stack.

2. The ribbon stack configuration of claim 1, wherein said vertical stack includes twenty 12-count fiber ribbons.

3. The ribbon stack configuration of claim 1, wherein said first and second perpendicular groups include five 24-count fiber ribbons.

4. The ribbon stack configuration of claim 1, further including:
    a third perpendicular group having a plurality of fiber ribbons, wherein said third group is perpendicularly coupled to an outer edge of the first perpendicular group; and
    a fourth perpendicular group having a plurality of fiber ribbons, wherein said fourth perpendicular group is perpendicularly coupled to an outer edge of the second perpendicular group.

5. The ribbon stack configuration of claim 4, wherein said ribbon stack configuration is substantially cross-type in shape.

6. The ribbon stack configuration of claim 4, wherein said vertical stack includes twenty-four 12-count fiber ribbons.

7. The ribbon stack configuration of claim 4, wherein said first and second perpendicular groups include five 24-count fiber ribbons.

8. The ribbon stack configuration of claim 4, wherein said third and fourth perpendicular groups include three 12-count fiber ribbons.

9. The ribbon stack configuration of claim 4, wherein said first and second perpendicular groups have more fiber ribbons than said third and fourth perpendicular groups.

10. A buffer tube comprising:
    a plurality of fiber ribbons, wherein said fiber ribbons, lying in a parallel direction, are vertically stacked to create a vertical stack having a first side and a second side;
    a first perpendicular group having a plurality of fiber ribbons, wherein said first group is perpendicularly affixed to said first side of said vertical stack;
    a second perpendicular group having a plurality of fiber ribbons, wherein said second group is perpendicularly affixed to said second side of said vertical stack; and
    a tube encapsulating said fiber ribbons.

11. The buffer tube of claim 10, wherein said vertical stack includes twenty 12-count fiber ribbons.

12. The buffer tube of claim 10, wherein said first and second perpendicular groups include five 24-count fiber ribbons.

13. The buffer tube of claim 1, wherein said ribbon stack, having a square configuration, has a fiber count substantially equal to 480.

14. The buffer tube of claim 10, wherein said ribbon stack further comprises:
    a third perpendicular stack having a plurality of fiber ribbons, wherein said third perpendicular stack is coupled to an outer edge of said first perpendicular stack; and
    a fourth perpendicular stack having a plurality of fiber ribbons, wherein said fourth perpendicular stack is coupled to an outer edge of said second perpendicular stack.

15. The buffer tube of claim 14, wherein said ribbon stack is substantially cross-type in configuration.

16. The buffer tube of claim 14, wherein said third and fourth perpendicular stacks include three 12-count fiber ribbons.

17. The buffer tube of claim 15, wherein said optimal ribbon stack, having a cross-type configuration, has a total fiber count substantially equal to 600.

18. A buffer tube having an optimal ribbon stack configuration comprising:
   a fiber ribbon stack wherein said ribbon stack includes a vertical stack of fiber ribbons having a first side to which a first perpendicular stack of a plurality of fiber ribbons is coupled and a second side to which a second perpendicular stack of a plurality of fiber ribbons is coupled; and
   at least one cushion member positioned between said fiber ribbon stack and a wall of said buffer tube, wherein said cushion member protects said fiber ribbon stack within said buffer tube and enables said fiber ribbon stack to be self centering within said buffer tube.

19. The buffer tube having an optimal ribbon stack configuration of claim 18, wherein said ribbon stack is substantially square in shape.

20. The buffer tube having an optimal ribbon stack configuration of claim 18, further including:
   a third and fourth perpendicular stack of a plurality of ribbon fibers, wherein said third perpendicular stack is coupled to an outer edge of said first perpendicular stack and said fourth perpendicular stack is coupled to an outer edge of said second perpendicular stack.

21. The buffer tube having an optimal ribbon stack configuration of claim 20, wherein the ribbon stack is substantially cross-type in shape.

22. An optical fiber unit comprising:
   at least one buffer tube;
   a fiber ribbon stack encapsulated in said buffer tube wherein said fiber ribbon stack includes a vertical stack of fiber ribbons having a first side to which a first perpendicular stack having a plurality of fiber ribbons is coupled, and a second side to which a second perpendicular stack having a plurality of fiber ribbons is coupled; and
   at least one cushion member positioned between said fiber ribbon stack and a wall of said buffer tube, wherein said cushion member protects said fiber ribbon stack from contact with said wall of said buffer tube and enables said fiber ribbon stack to be self-centering within said buffer tube.

23. The optical fiber unit of claim 22, wherein said ribbon stack is substantially square in shape.

24. The optical fiber unit of claim 22, wherein the fiber ribbon stack further includes:
   a third and fourth perpendicular stack having a plurality of fiber ribbons, said third perpendicular stack being coupled to an outer edge of said first perpendicular stack and said fourth perpendicular stack being coupled to an outer edge of said second perpendicular stack.

25. The optical fiber unit of claim 22, wherein the fiber ribbon stack is substantially cross-type in shape.

26. A method of manufacturing a high fiber count ribbon stack configuration comprising:
   creating a vertical fiber ribbon stack having a first side and a second side by placing parallel lying fiber ribbons on top of one another;
   coupling a first perpendicular fiber ribbon group to said first side of said vertical stack; and
   coupling a second perpendicular fiber ribbon group to said second side of said vertical stack.

27. The method of manufacturing a high fiber count ribbon stack configuration of claim 26, wherein said first and second perpendicular groups include five 24-count fiber ribbons.

28. The method of manufacturing a high fiber count ribbon stack configuration of claim 26, further including:
   affixing a third perpendicular fiber ribbon group to an outer edge of said first perpendicular stack; and
   affixing a fourth perpendicular fiber ribbon group to an outer edge of said second perpendicular stack.

29. The method of manufacturing a high fiber count ribbon stack configuration of claim 28, wherein said ribbon configuration is substantially cross-type in shape.

30. The method of manufacturing a high fiber count ribbon stack configuration of claim 28, wherein said third and fourth perpendicular stacks include three 12-count fiber ribbons.

31. A method of manufacturing a fiber optic cable having a high fiber count comprising:
   creating a vertical fiber ribbon stack having a first side and a second side by placing parallel lying fiber ribbons on top of one another;
   coupling a first perpendicular fiber ribbon group to said first side of said vertical stack;
   coupling a second perpendicular fiber ribbon group to said second side of said vertical stack; thereby creating a fiber ribbon stack square in shape;
   placing a plurality of cushioning members around said fiber ribbon stack, wherein said cushioning member enables said ribbon stack to be self-centering; and
   encapsulating said fiber ribbon stack having a square shape in said buffer tube.

32. The method of manufacturing a fiber optic cable having a high fiber count of claim 31, wherein said fiber ribbon stack is square shaped in configuration by forming a vertical stack of 12-count fiber ribbons having a first side to which a first perpendicular stack having a plurality of 24-count fiber ribbons is coupled, and a second side to which a second perpendicular stack having a plurality of 24-count fiber ribbons is coupled.

33. The method of manufacturing a fiber optic cable having a high fiber count of claim 31, wherein said fiber ribbon stack is cross-type in configuration by coupling a third perpendicular stack of fiber ribbons to an outer edge of the first perpendicular stack and coupling a fourth perpendicular stack of fiber ribbons to an outer edge of the second perpendicular stack.

* * * * *